(12) United States Patent
Tiku et al.

(10) Patent No.: US 12,547,987 B2
(45) Date of Patent: Feb. 10, 2026

(54) AGGREGATING REEFER PARAMETERS AND INSPECTION TEST RESULTS FOR ALLOCATION OF HEALTHY REEFERS WITH HIGH CONFIDENCE

(71) Applicant: Carrier Corporation, Palm Beach Gardens, FL (US)

(72) Inventors: Harsh Tiku, Telangana (IN); Kusuma Kumari Paidi, Telangana (IN); Narasimha Murthy Gudla, Telangana (IN); Rajesh Kumar Sirigineedi, Telangana (IN); Viharshitha Garithra, Telangana (IN); Sumantra Ghosh, Telangana (IN); David Follansbee, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 461 days.

(21) Appl. No.: 18/159,309

(22) Filed: Jan. 25, 2023

(65) Prior Publication Data
US 2023/0237446 A1    Jul. 27, 2023

Related U.S. Application Data

(60) Provisional application No. 63/302,733, filed on Jan. 25, 2022.

(51) Int. Cl.
*G06Q 10/20* (2023.01)
*F25D 11/00* (2006.01)
(Continued)

(52) U.S. Cl.
CPC ........... *G06Q 10/20* (2013.01); *F25D 11/003* (2013.01); *G06Q 10/0832* (2013.01); *G06Q 10/0838* (2013.01); *G06Q 30/012* (2013.01)

(58) Field of Classification Search
CPC ............. G06Q 30/012; G06Q 10/0832; G06Q 10/0838; G06Q 10/20; F25D 29/008; F25D 11/003
(Continued)

(56) References Cited

U.S. PATENT DOCUMENTS

| 7,784,707 B2 | 8/2010 | Witty et al. |
| 8,461,958 B2 | 6/2013 | Saenz et al. |

(Continued)

FOREIGN PATENT DOCUMENTS

| CN | 110264024 A | 9/2019 |
| CN | 110910057 A | 3/2020 |

(Continued)

OTHER PUBLICATIONS

European Search Report for Application No. 23151687.3, Issued May 12, 2023, 7 Pages.

(Continued)

*Primary Examiner* — John H Le
(74) *Attorney, Agent, or Firm* — CANTOR COLBURN LLP (57) ABSTRACT

A method of monitoring a health of a transportation refrigeration unit including: receiving at least one of an alarm of one or more components of the transportation refrigeration unit, test data on the one or more components of the transportation refrigeration unit, historical trip data of the transportation refrigeration unit, or service data of the transportation refrigeration unit; receiving reefer parameters of the transportation refrigeration unit; determining a health score of the transportation refrigeration unit based on at least the reefer parameters; and determining a maintenance action for transportation refrigeration unit based on the health score and at least one of the alarm, the test data, the historical trip data, or the service data.

17 Claims, 4 Drawing Sheets

(51) Int. Cl.
*G06Q 10/083* (2024.01)
*G06Q 10/0832* (2023.01)
*G06Q 30/012* (2023.01)

(58) Field of Classification Search
USPC ........................................................ 702/184
See application file for complete search history.

(56) References Cited

U.S. PATENT DOCUMENTS

| | | |
|---|---|---|
| 8,959,036 B2 | 2/2015 | Huat |
| 9,037,302 B2 | 5/2015 | O'Neill et al. |
| 9,097,456 B2 | 8/2015 | Thøgersen et al. |
| 9,103,805 B2 | 8/2015 | Gettings et al. |
| 9,218,585 B2 | 12/2015 | Gupta |
| 9,471,452 B2 | 10/2016 | Mcelhinney et al. |
| 9,501,920 B2 | 11/2016 | Harring et al. |
| 9,691,091 B2 | 6/2017 | Jones et al. |
| 9,886,799 B2 | 2/2018 | Kwak |
| 9,996,814 B2 | 6/2018 | Jones et al. |
| 10,451,341 B2 | 10/2019 | Jónsson et al. |
| 10,621,674 B2 | 4/2020 | Jones et al. |
| 10,962,995 B2 | 3/2021 | Conlon |
| 10,984,368 B2 | 4/2021 | Williams et al. |
| 11,079,173 B2 | 8/2021 | Jonsson et al. |
| 2013/0036068 A1 | 2/2013 | Smith et al. |
| 2013/0191072 A1 | 7/2013 | Hadderman et al. |
| 2013/0271290 A1* | 10/2013 | Saenz ................... G05D 27/02 |
| | | 340/870.07 |
| 2016/0063433 A1 | 3/2016 | Glasgow et al. |
| 2019/0072320 A1 | 3/2019 | Devi et al. |
| 2019/0277558 A1 | 9/2019 | Adetola et al. |
| 2020/0002125 A1* | 1/2020 | Liaskas ................ G06Q 10/20 |
| 2020/0034788 A1 | 1/2020 | Ynion, Jr. |
| 2020/0298672 A1 | 9/2020 | Yasar et al. |
| 2020/0364630 A1 | 11/2020 | Bhave et al. |
| 2021/0287163 A1 | 9/2021 | N et al. |

FOREIGN PATENT DOCUMENTS

| | | | | |
|---|---|---|---|---|
| CN | 112085347 A | 12/2020 | | |
| EP | 2105688 A2 | 9/2009 | | |
| EP | 3039360 A1 | 7/2016 | | |
| EP | 3017981 B1 | 8/2018 | | |
| EP | 3039360 B1 * | 6/2019 | ............ | G05B 17/02 |
| JP | 4146789 B2 | 9/2008 | | |
| WO | 2021101961 A1 | 5/2021 | | |

OTHER PUBLICATIONS

European Office Action for Application No. 23151687.3, Issued Mar. 26, 2025, 5 Pages.

* cited by examiner

AGGREGATING REEFER PARAMETERS AND INSPECTION TEST RESULTS FOR ALLOCATION OF HEALTHY REEFERS WITH HIGH CONFIDENCE

CROSS-REFERENCE TO RELATED APPLICATIONS

This application claims the benefit of U.S. Provisional Application No. 63/302,733 filed Jan. 25, 2022, all of which are incorporated herein by reference in their entirety.

BACKGROUND

The embodiments herein generally relate to transport refrigeration systems and more specifically, a method and apparatus for monitoring a health of transport refrigeration system.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated containers are commonly used to transport perishable goods in a cold chain distribution system. A transport refrigeration unit (i.e., reefer) is mounted to the container in operative association with a cargo space defined within the container for maintaining a controlled temperature environment within the cargo space.

Conventionally, transport refrigeration units used in connection with refrigerated containers include a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

The health of the transport refrigeration systems is critical to ensure that the transport refrigeration system is capable of completing a journey without failing.

BRIEF DESCRIPTION

According to one embodiment, a method of monitoring a health of a transportation refrigeration unit is provided. The method including: receiving at least one of an alarm of one or more components of the transportation refrigeration unit, test data on the one or more components of the transportation refrigeration unit, historical trip data of the transportation refrigeration unit, or service data of the transportation refrigeration unit; receiving reefer parameters of the transportation refrigeration unit; determining a health score of the transportation refrigeration unit based on at least the reefer parameters; and determining a maintenance action for transportation refrigeration unit based on the health score and at least one of the alarm, the test data, the historical trip data, or the service data.

In addition to one or more of the features described above, or as an alternative, further embodiments may include that determining the health score of the transportation refrigeration unit based on at least the reefer parameters further includes: assigning a weight to each of the reefer parameters; generating a weighted health prediction from each of the one or more components of the transportation refrigeration unit; and combining the output weighted health predictions into the health score of the transportation refrigeration unit.

In addition to one or more of the features described above, or as an alternative, further embodiments may include displaying the health score on a computing device.

In addition to one or more of the features described above, or as an alternative, further embodiments may include: receiving user feedback; and adjusting the heath score based on the user feedback.

In addition to one or more of the features described above, or as an alternative, further embodiments may include: receiving warranty data; and adjusting the heath score based on the warranty data.

In addition to one or more of the features described above, or as an alternative, further embodiments may include that receiving user feedback; and adjusting the weight assigned to each of the reefer parameters based on the user feedback.

In addition to one or more of the features described above, or as an alternative, further embodiments may include: receiving warranty data; and adjusting the weight assigned to each of the reefer parameters based on the warranty data.

In addition to one or more of the features described above, or as an alternative, further embodiments may include that the reefer parameters include operational parameters of the transportation refrigeration unit.

According to another embodiment, a health analytics device for monitoring a health of a transportation refrigeration unit is provided. The health analytics device including: a processor; and a memory including computer-executable instructions that, when executed by the processor, cause the processor to perform operations, the operations including: receiving at least one of an alarm of one or more components of the transportation refrigeration unit, test data on the one or more components of the transportation refrigeration unit, historical trip data of the transportation refrigeration unit, or service data of the transportation refrigeration unit; receiving reefer parameters of the transportation refrigeration unit; determining a health score of the transportation refrigeration unit based on at least the reefer parameters; and determining a maintenance action for transportation refrigeration unit based on the health score and at least one of the alarm, the test data, the historical trip data, or the service data.

In addition to one or more of the features described above, or as an alternative, further embodiments may include that determining the health score of the transportation refrigeration unit based on at least the reefer parameters further includes: assigning a weight to each of the reefer parameters; generating a weighted health prediction from each of the one or more components of the transportation refrigeration unit; and combining the output weighted health predictions into the health score of the transportation refrigeration unit.

In addition to one or more of the features described above, or as an alternative, further embodiments may include that the operations further include: displaying the health score on a computing device.

In addition to one or more of the features described above, or as an alternative, further embodiments may include that the operations further include: receiving user feedback; and adjusting the heath score based on the user feedback.

In addition to one or more of the features described above, or as an alternative, further embodiments may include that the operations further include: receiving warranty data; and adjusting the heath score based on the warranty data.

In addition to one or more of the features described above, or as an alternative, further embodiments may include that the operations further include: receiving user feedback; and adjusting the weight assigned to each the reefer parameters based on the user feedback.

In addition to one or more of the features described above, or as an alternative, further embodiments may include that the operations further include: receiving warranty data; and adjusting the weight assigned to each of the reefer parameters based on the warranty data.

In addition to one or more of the features described above, or as an alternative, further embodiments may include that the reefer parameters include operational parameters of the transportation refrigeration unit.

According to another embodiment, a computer program product tangibly embodied on a non-transitory computer readable medium is provided. The computer program product including instructions that, when executed by a processor, cause the processor to perform operations including: receiving at least one of an alarm of one or more components of the transportation refrigeration unit, test data on the one or more components of the transportation refrigeration unit, historical trip data of the transportation refrigeration unit, or service data of the transportation refrigeration unit; receiving reefer parameters of the transportation refrigeration unit; determining a health score of the transportation refrigeration unit based on at least the reefer parameters; and determining a maintenance action for transportation refrigeration unit based on the health score and at least one of the alarm, the test data, the historical trip data, or the service data.

In addition to one or more of the features described above, or as an alternative, further embodiments may include that determining the health score of the transportation refrigeration unit based on at least the reefer parameters further includes: assigning a weight to each of the reefer parameters; generating a weighted health prediction from each of the one or more components of the transportation refrigeration unit; and combining the output weighted health predictions into the health score of the transportation refrigeration unit.

In addition to one or more of the features described above, or as an alternative, further embodiments may include that the operations further include: displaying the health score on a computing device.

In addition to one or more of the features described above, or as an alternative, further embodiments may include that the operations further include: receiving user feedback; and adjusting the heath score based on the user feedback.

Technical effects of embodiments of the present disclosure include determining a health of a transportation refrigeration unit based on alarms, test data, historical trip data, service data, and reefer parameters.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
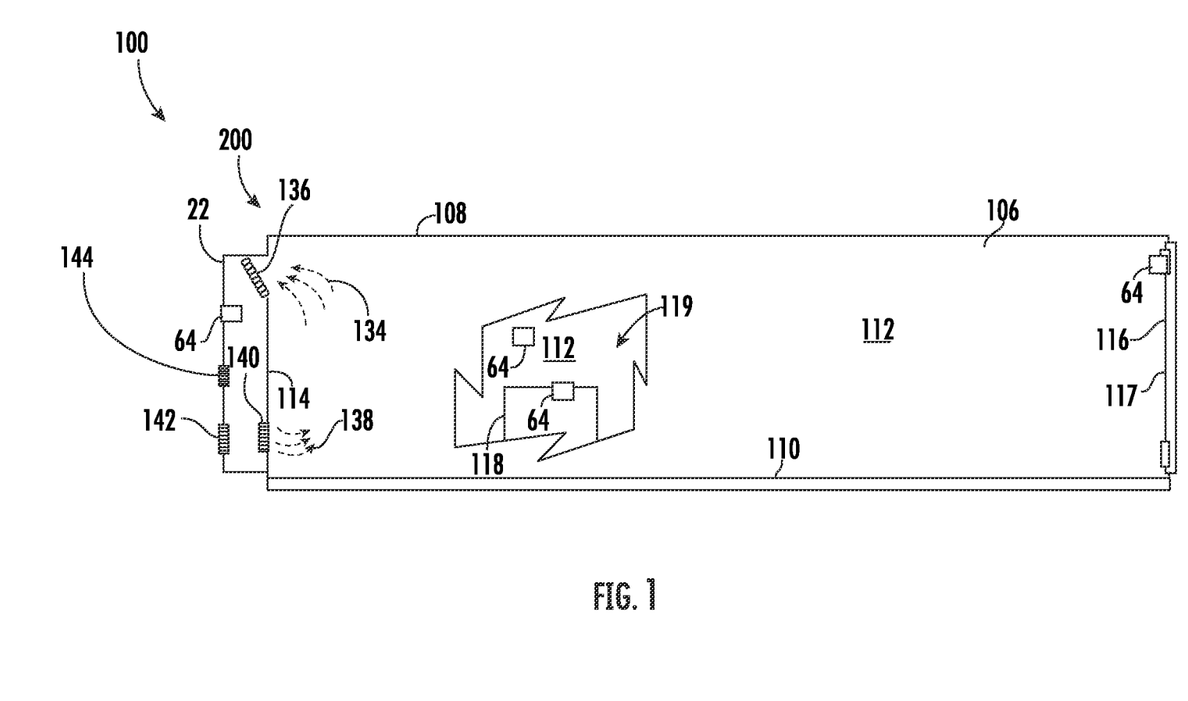
FIG. 1 is a schematic illustration of a transport refrigeration system, according to an embodiment of the present disclosure.
Figure 2:
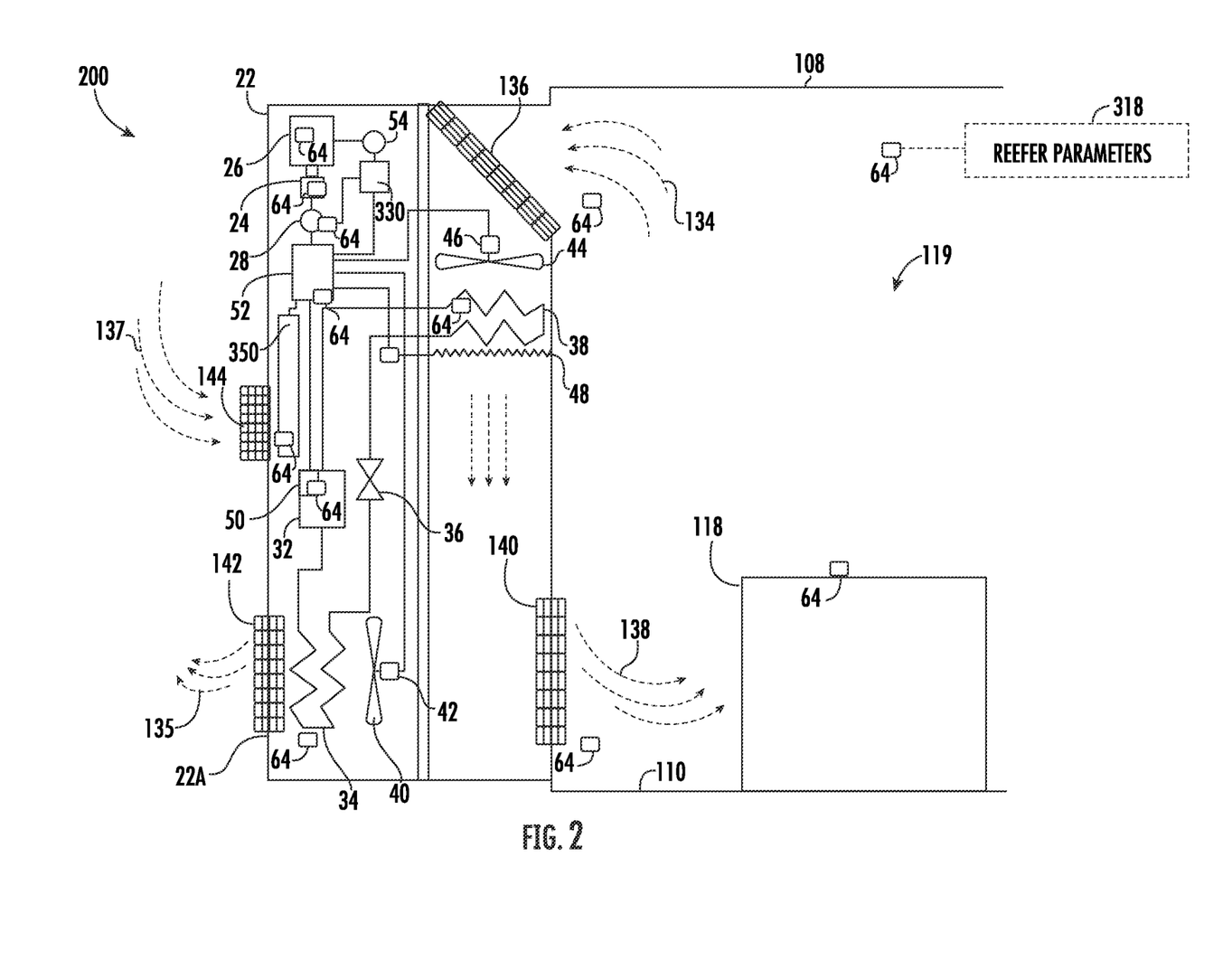
FIG. 2 is an enlarged schematic illustration of a transportation refrigeration unit of the transport refrigeration system of FIG. 1, according to an embodiment of the present disclosure.

Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a refrigerated container system 100, as seen in FIG. 1. The transport container 106 is a refrigerated trailer and includes a top wall 108, a directly opposed bottom wall 110, opposed side walls 112, and a front wall 114. The transport container 106 further includes a door or doors 117 at a rear wall 116, opposite the front wall 114. The walls of the transport container 106 define a refrigerated cargo space 119. The refrigerated cargo space 119 may be subdivided into multiple different compartments that each have a different controlled environment (e.g., different temperature). It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport.

The transport refrigeration system 200 includes a transportation refrigeration unit 22, an electric generation device 24, a prime mover 26 for driving the electric generation device 24, and a controller 330. The transportation refrigeration unit 22 is in operative association with the refrigerated cargo space 119 and is configured to provide conditioned air to the transport container 106. The transportation refrigeration unit 22 functions, under the control of the controller 330, to establish and regulate a desired environmental parameters, such as, for example temperature, pressure, humidity, carbon dioxide, ethylene, ozone, biosensors, infrared sensors (detecting gas leaks), light exposure, vibration exposure, door lock sensors and other conditions in one or more compartments of the refrigerated cargo space 119, as known to one of ordinary skill in the art. In an embodiment, the transportation refrigeration unit 22 is capable of providing a desired temperature and humidity range.

The transportation refrigeration unit 22 includes a refrigerant compression device 32, a refrigerant heat rejection heat exchanger 34 (e.g., condenser), an expansion device 36, and a refrigerant heat absorption heat exchanger 38 (e.g., evaporator) connected in refrigerant flow communication in a closed loop refrigerant circuit and arranged in a conventional refrigeration cycle. The transportation refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transportation refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transportation refrigeration unit 22 is operating in a subcritical refrigerant cycle or as a refrigerant gas cooler, such as if the transportation refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled after traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transportation refrigeration unit 22. A return airflow 134 flows into the transportation refrigeration unit 22 from the refrigerated cargo space 119 through the return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transportation refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transportation refrigeration unit 22 can further be operated in reverse to warm the container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transportation refrigeration unit 22.

The transport refrigeration system 200 also includes a controller 330 configured for controlling the operation of the transport refrigeration system 200 including, but not limited to, the operation of various components of the refrigerant unit 22 to provide and maintain a desired thermal environment within the refrigerated cargo space 119. The controller 330 may also be able to selectively operate the prime mover 26, typically through an electronic engine controller 54 operatively associated with the prime mover 26. The controller 330 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The prime mover 26, which may comprise an on-board fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Alternatively, the in an all-electric unit, the prime mover 26 may be replaced and/or supplemented by an energy storage device 350 that powers the compression device drive motor 50. The energy storage device 350 may store and provide electrical energy to power the compression device drive motor 50 and various other power demands of the transportation refrigeration unit 22. The electric generation device 24 may also be used to charge the energy storage device 350. The transportation refrigeration unit 22 may be powered by the energy storage device 350, which provides electrical energy to the transportation refrigeration unit 22 and will be discussed further below. Examples of the energy storage device 350 may include a battery system (e.g., a battery or bank of batteries), fuel cells, flow battery, and others devices capable of storing and outputting electric energy that may be direct current (DC). The energy storage device 350 may include a battery system, which may employ multiple batteries organized into battery banks. In one embodiment, the energy storage device 350 may provide electrical energy to the transportation refrigeration unit 22 and the propulsion motor 320 of the vehicle 102. In one embodiment, the energy storage device 350 is located within of the transportation refrigeration unit 22, as shown in FIG. 1. In another embodiment, the energy storage device 350 is located outside the transportation refrigeration unit 22.

The energy storage device 350 may be charged by a stationary charging station such as, for example a wall 48V power outlet. The charging station may provide single phase (e.g., level 2 charging capability) or three phase alternating current (AC) energy to the energy storage device 350. It is understood that the charging station may have any phase charging and embodiments disclosed herein are not limited to single phase or three phase AC power. In an embodiment, the single phase AC power may be a high voltage DC power, such as, for example, between 48 to 900 VDC.

The transportation refrigeration unit 22 has a plurality of electrical power demand loads, that may include but are not limited to, the display 400, the input device 408, the compression device drive motor 50 for the refrigerant compression device 32, the fan motor 42 for the fan 40 associated with the refrigerant heat rejection heat exchanger 34, and the fan motor 46 for the fan 44 associated with the refrigerant heat absorption heat exchanger 38. It is to be understood that, while not required, various power converters 52, such as, for example, AC to DC rectifiers, DC to AC inverters, AC to AC voltage/frequency converters, and DC to DC voltage converters, may be employed in connection with the energy storage device 150 as appropriate. In an embodiment, each of the fan motors 42, 46 and the compression device drive motor 50 may be an AC motor and are thus electrically connected to the energy storage device 350 through a DC-to-AC variable invertor within the power converter 52 that is configured to convert the DC electrical energy from the energy storage device to AC electrical energy in a variable continuous energy output to power the transportation refrigeration unit 22.

In the depicted embodiment, the heater 48 also constitutes an electrical power demand load. The heater 48 may be selectively operated by the controller 330 whenever a control temperature within the temperature controlled cargo box drops below a preset lower temperature limit, which may occur in a cold ambient environment. In such an event the controller 330 would activate the heater 48 to heat air circulated over the heater 48 by the fan(s) 44 associated with the refrigerant heat absorption heat exchanger 38. The heater 48 may also be used to de-ice the return air intake 136. Additionally, the compression device drive motor 50 being used to power the refrigerant compression device 32 may also constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage from the energy storage device 350.

Figure 3:
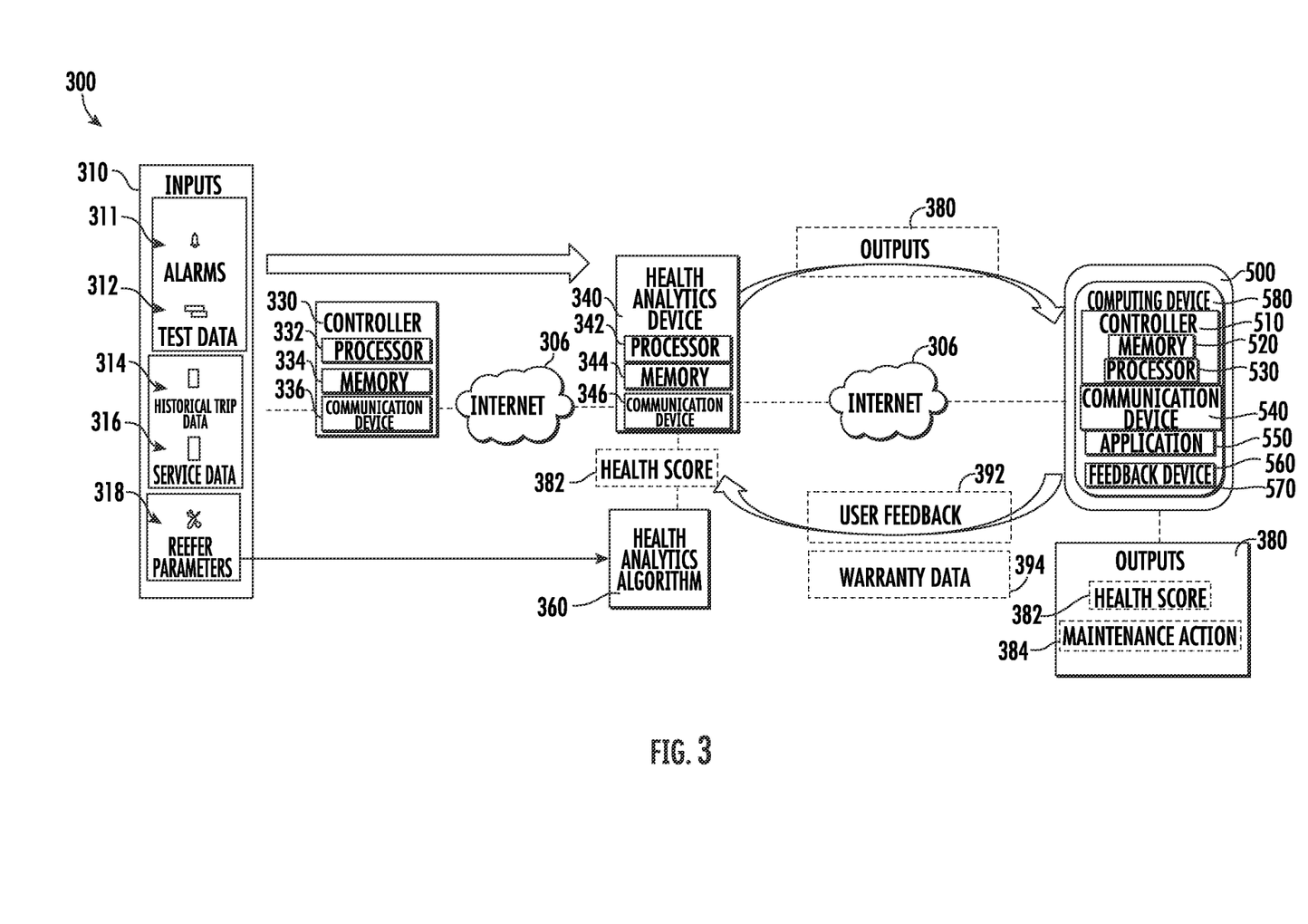
FIG. 3 is a schematic illustration of a reefer health monitoring system, according to an embodiment of the present disclosure.

The transport refrigeration system 200 includes one or more sensors 64. The sensors 64 may be utilized to monitor reefer parameters 318 internal and external to the transport container 106. The sensors 64 may be placed at various locations throughout the transport refrigeration system 200 in order to monitor reefer parameters 318. FIGS. 2 and 3, illustrate exemplary locations of the sensors 64, however the embodiments disclosed herein are not limited only to the locations of the sensors 64 illustrated and the sensors 64 may be located at different locations than illustrated. It is also understood that the sensors 64 may not be separate components but rather may be incorporated in the component of the transport refrigeration system 200 that is being monitored. It should be appreciated that, although particular systems are separately defined in the schematic block diagrams, each or any of the systems may be otherwise combined or separated via hardware and/or software. There may be analog sensors and/or digital sensors used. Analog data from an analog sensor is converted to digital by logic boards in the controller 330 or dedicated controller of the component of the transport refrigeration system 200.

The reefer parameters 318 monitored by the sensors 64 may also include operational parameters of the transportation refrigeration unit 22, such as, for example, a condenser pressure, a discharge pressure, a supply air temperature, a return air temperature sensor, a temperature setpoint, an ambient temperature, a suction temperature, a discharge temperature, a suction pressure, a discharge pressure, a reefer control mode, a control mode compressor state, a reefer control mode-control mode defrost state, a reefer control mode—control mode heater state, an electrical current, a line voltage, a frequency, a humidity, or any other operational parameter known to one of skill in the art.

The reefer parameters 318 monitored by the sensors 64 may also include environmental parameters, such as, for example, to temperature, pressure, humidity, carbon dioxide, ethylene, ozone, light exposure, vibrations, pathogens, and other conditions in the refrigerated cargo space 119 or outside of the refrigerated cargo space 119. Accordingly, suitable sensors 64 are utilized to monitor the desired parameters. Advantageously, sensors 64 may be selected for certain applications depending on the perishable goods 118 to be monitored and the corresponding environmental sensitivities. In an embodiment, temperatures are monitored. In certain embodiments, a user desires to maintain and monitor temperatures or other parameters within an acceptable range. As seen in FIG. 2, the sensors 64 may be placed directly on the perishable goods 118.

Further, as in the illustrated embodiment, sensors 64 may be used to monitor various reefer parameters 318 of the transport refrigeration system 200. These sensors 64 may be placed in a variety of locations including but not limited to on the transportation refrigeration unit 22, on a door 117 of the transport container 106 and throughout the interior compartment 18. The sensors 64 may be placed directly within the transportation refrigeration unit 22 to monitor the performance of the transportation refrigeration unit 22. Individual components internal to the transportation refrigeration unit 22 may also be monitored by sensors 64 to detect performance aspects, such as, for example usage cycles, duration, temperatures and pressure of individual components.

As seen, the sensors 64 may also be placed on the door 117 of the transport container 106 to monitor the position of the door 117. Whether the door 117 is open or closed affects both the temperature of the transport container 106 and the performance of the transportation refrigeration unit 22. For instance, in hot weather, an open door 117 will allow cooled air to escape from the transport container 106, causing the temperature of the interior compartment 18 to rise, which creates additional stress on the transportation refrigeration unit 22 by forcing the transportation refrigeration unit 22 to work harder to cool the interior compartment 18.

Additionally, the global positioning system (GPS) location may also be detected by the sensors 64. The GPS location may help in providing information regarding local weather (including solar gain) experienced by the transport container 106 along the travel route. The local weather affects the temperature of the transport container 106 and thus affects the operation on the transportation refrigeration unit 22. For instance, the transportation refrigeration unit 22 may have to work harder on a transport container 106 travelling through a desert or across oceans where it may be is exposed to long periods of heat and solar gain and harsh climates.

As illustrated in FIG. 1, the transport refrigeration system 200 may further include a controller 330 configured to log a plurality of readings from the sensors 64, known as reefer parameters 318, at a selected sampling rate. The reefer parameters 318 may further be augmented with time, position stamps or other relevant information.

Referring now to FIG. 3, with continued reference to FIGS. 1 and 2, a reefer health monitoring system 300 is illustrated, in accordance with an embodiment of the present disclosure. The health monitoring system 300 includes the controller 330 of the transportation refrigeration unit 22, a health analytics device 340, and a computer application 550 installed on a computing device 500 or accessible by the computing device 500 (e.g., a website or software as a service).

The controller 330 is in communication with the health analytics device 340. The health analytics device 340 may be local, remote, or cloud based. The controller 330 may be in communication with the health analytics device 340 via the internet 306. The computing device 500 is in communication with the health analytics device 340. The computing device 500 may be in communication with the health analytics device 340 via the internet 306

The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, Sub-GHz RF Channel, cellular, LORA, 4GLTE/5G Cellular, VSAT/SATCOM (ocean communication) or any other wireless signal known to one of skill in the art. The communication device 336 may be configured to communicate directly with the health analytics device 340. Alternatively or additionally, the communication device 336 may be configured to communicate with the health analytics device 340 through the internet 306.

The health analytics device 340 may include a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium. The health analytics device 340 may be a single device or may be distributed across multiple different devices. The may be replicated environments to manage disaster recovery and ease the geographical access without latencies.

The health analytics device 340 also includes a communication device 346. The communication device 346 may be capable of wireless communication including but not limited to Wi-Fi, Bluetooth, Zigbee, Sub-GHz RF Channel, cellular, hardlines, ethernet fibers, optical fibers, or any other wireless signal known to one of skill in the art. The communication device 346 may be configured to communicate directly with the computing device 500. Alternatively, or additionally, the communication device 346 may be configured to communicate with the computing device 500 through the internet 306.

The computing device 500 may be a desktop computer, a laptop computer, or a mobile computing device that is typically carried by a person, such as, for example a phone, a smart phone, a PDA, a smart watch, a tablet, a laptop, voice assistant device, computer assisted/computer display eyewear, smart glasses, mixed reality smart glasses, or any other mobile computing device known to one of skill in the art.

The computing device 500 includes a controller 510 configured to control operations of the computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The computing device 500 includes a communication device 540 configured to communicate with the internet 306 through a wired connection or one or more wireless signals. The one or more wireless signals may include Wi-Fi, Bluetooth, Zigbee, Sub-GHz RF Channel or any other wireless signal known to one of skill in the art. Alternatively, the computing device 500 may be connected to the internet 306 through a hardwired connection. The computing device 500 is configured to communicate with the health analytics device through the internet 306 or directly.

The computing device 500 may include a display device 580, such as for example a computer display, an LCD display, an LED display, an OLED display, a touchscreen of a smart phone, tablet, or any other similar display device known to one of the skill in the art. A user operating the computing device 500 is able to view the computer application 550 and outputs 380 generated by the health monitoring system 300 through the display device 580.

The computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, proximity based assistance device, a voice assistant configured to receive a voice command, an inertial measurement unit configured to detect a shake of the computing device 500, or any similar input device known to one of skill in the art. The user operating the computing device 500 is able to enter user feedback 392 into the computer application 550 through the input device 570. The input device 570 allows the user operating the computing device 500 to enter feedback into the computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The computing device 500 device may also include a feedback device 560. The feedback device 560 may activate in response to a manual input via the input device 570. The feedback device 560 may be a haptic feedback vibration device and/or a speaker emitting a sound. The feedback device 560 device may activate to confirm that the manual input entered via the input device 570 was received via the computer application 550. For example, the feedback device 560 device may activate by emitting an audible sound or vibrate the computing device 500 to confirm that the manual input entered via the input device 570 was received via the computer application 550. The feedback device 560 may be activated when an output 380 is received from the health analytics device 340.

The health analytics device 340 is configured to determined outputs 380 based on inputs 310 received. More specifically, the health analytics device 340 is configured to analyze the inputs 310 and determine a health score 382 for the transportation refrigeration unit 22.

The inputs 310 are transmitted to a health analytics device 340. The inputs 310 may be from separate sources and collected at the health analytics device 340. Alternatively, the controller 330 may collect one or more inputs 310 and transmit the inputs 310 to the health analytics device 340. For example, the controller 330 may collect the reefer parameters 318 detected by the sensors 64 and transmit the reefer parameters 318 to the health analytics device 340.

The inputs 310 may include alarms 311, test data 312, historical trip data 314, service data 316, and reefer parameters 318. The alarms 311 may be an alert or alarm generated by any component of the transportation refrigeration unit 22. For example, a component of the transportation refrigeration unit 22 when it needs to be serviced, has failed, or is operating outside of desired operational ranges. The alarms 311 may have a classification, such as, critical or non-critical. Some alarms 311 may be may require immediate attention, such as, for example, closing of open doors. Some alarms 311 may include pressure or temperature sensor failures, refrigerant leaks, electrical overcurrent, electrical overload, or electrical short circuits. If error conditions are recovered, the events are logged into the data file which are communicated to the health analytics device 340.

The alarms 311 may be communicated to the controller 330 and the controller 330 may transmit the alarms 311 to the health analytics device 340.

The test data 312 is the detailed data from tests performed on specific components of the transportation refrigeration unit 22. The tests may be pre-trip tests that are run on one or more components of the transportation refrigeration unit 22. The pre-trips tests may help to determine whether the one or more components of the transportation refrigeration unit 22 are operating properly prior to embarking on a trip. Alternatively, the test data 312 may be tests that are run periodically on the one or more components of the transportation refrigeration unit 22 during run time of the unit, when the transportation refrigeration unit 22 finds itself in an opportunistic time, while a trip is progress. In one example, the test data 312 may include a current drawn by the refrigerant compression device 32 or of a fan motor 42, 46 during a test. The test data 312 may also ensure that the environmental conditions within the refrigerated cargo space 119 are good prior to departing. The test data 312 may be communicated to the controller 330 and the controller 330 may transmit the test data 312 to the health analytics device 340.

The historical trip data 314 are the reefer parameters 318 that were stored from previous trips of the transportation refrigeration unit 22. The historical trip data 314 may be stored within the controller 330 for a selected period of time, such as, for example, 30-60 days. The historical trip data 314 may be communicated to the controller 330 during each trip as reefer parameters 318 and the controller 330 may transmit the historical trip data 314 to the health analytics device 340. The historical trip data 314 is not only what the transportation refrigeration unit 22 sends at a time but also data present in the memory 344 from all data collected from previous trips since the transportation refrigeration unit 22 was enabled with communication device in its lifetime. This historical trip data 314 is a combination of the events, time based log of data collected from sensors on the equipment and ambient temperatures with the cargo loaded, a log of actions taken/commands executed within the controller 330 based on the controller algorithm or driven by local/remote device, location details, configuration changes made during the trip, data recording collected from Service tools by the technician that are uploaded to the server for analysis, alarm reset action done at service centers by service tools after maintenance, and/or instances of configuration parameters overriding for service purpose or by the driver/technician while trip in transit.

The service data 316 may be detailed service reports of the transportation refrigeration unit 22, which may describe, what component was serviced, the maintenance performed, any root causes found, and the operational status of the component following the service. The service data 316 may be maintained in an external database and communicated to the health analytics device 340.

The reefer parameters 318 are data collected during the current or latest trip of the transportation refrigeration unit 22. As aforementioned, the reefer parameters 318 may include operational parameters of the transportation refrigeration unit, such as, for example, a condenser pressure, a discharge pressure, a supply air temperature, a return air temperature, a temperature setpoint, an ambient temperature, a suction temperature, a discharge temperature, a suction pressure, a reefer control mode, an electrical current, a line voltage, a frequency, a humidity, or any other operational parameter known to one of skill in the art. The reefer parameters 318 may also include environmental parameters, such as, for example, temperature, pressure, humidity, carbon dioxide, ethylene, ozone, light exposure, vibrations, and other conditions in the refrigerated cargo space 119 or outside of the refrigerated cargo space 119. The reefer parameters 318 may be communicated to a health analytics algorithm 360 that may be located on the controller 330 or in identical the environment of health analytics device 340, the heath analytics device 340, another component, or in the internet 306 on a cloud database.

The health analytics algorithm 360 is configured to determine a health score 382 of the transportation refrigeration unit 22 based on at least the reefer parameters 318. The health score 382 may be a number indicating a health of the transportation refrigeration 22 as good, fair, or poor based on various thresholds.

The health analytics algorithm 360 may be configured to determine the health score 382 by determining a weighting to each of the reefer parameters 318, assigning the weights to each of the reefer parameters 318, then using a predictive model to generate a weighted health prediction from each of the components of the transportation refrigeration unit 22, and then combining the output weighted health predictions into an individual unit health score 382 of the transportation refrigeration unit 22 using appropriate scaling factors. The health score 382 may be displayed numerically or graphically on the display device 580 of the computing device 500 through the application 550. For example, the health score 282 may be a number between zero and one-hundred or a color coded scale.

The health score 282 may indicate how healthy a particular transportation refrigeration unit 22 might be and what are the odds that that particular transportation refrigeration unit 22 may fail and how soon. Transportation refrigeration units 22 that have a low health score 282 might be removed from service.

Outputs generated by the health analytics device 340 may include, but are not limited to, the health score 382 and maintenance actions.

The health analytics device 340 is configured to determine a maintenance action 384 for the transportation refrigeration unit 22 based on the health score 282 and at least one of an alarm 311 or test data 312. For example, a low health score combined with an alarm 311 may indicate that the transportation refrigeration unit 22 requires maintenance. In another example, a low health score combined with test data 312 may indicate that the transportation refrigeration unit 22 requires maintenance.

The health analytics device 340 may be also configured to consider historical trip data 314 and service data 316 when determining outputs 380. The health analytics device 340 is configured to determine a maintenance action 384 for the transportation refrigeration unit 22 based on the health score 282 and at least one of an alarm 311, test data 312, historical trip data 314, or service data 316.

A health score 282 below a selected health score combined with at least one of an alarm 311, test data 312, historical trip data 314, or service data 316 may trigger a maintenance action 384. The maintenance action 384 may be a list of components requiring action, root cause analysis, troubleshooting suggestions, health trend over time, service notifications, and/or scheduling of a service event.

The maintenance action 384 may generate a new service event for the transportation refrigeration unit 22 on a calendar or move a previously scheduled service event for the transportation refrigeration unit 22 to an earlier date on the calendar. An alert may be activated on a computing device 500 when a new service event is created, or a previously scheduled service event is moved to an earlier date on a calendar because of the health score 282 being below the selected health score. The calendar may be stored on the health analytics device 340, in the internet 306, and/or directly on the computing device 500.

The health analytics device 340 may utilize user feedback 392 and warranty data 394 to update the prediction modeling or algorithms for determining the outputs 380. The health analytics device 340 may be configured to update the health score 382 based on the user feedback 392 and/or the warranty data 394 using a machine learning workflow. The user feedback 392 may be used to reinforce, continually update, or modify the actions that are a result of the output 380. Further the user feedback 392 may be used to update weighting factors, learning parameters, or implement segmentation of data.

Referring now to FIG. 6, within continued reference to FIGS. 1-4, a flow chart illustrating a method 600 of monitoring a health of a transportation refrigeration unit 22, according to an embodiment of the present disclosure. The method 600 may be performed by the health analytics device 340.

Figure 4:
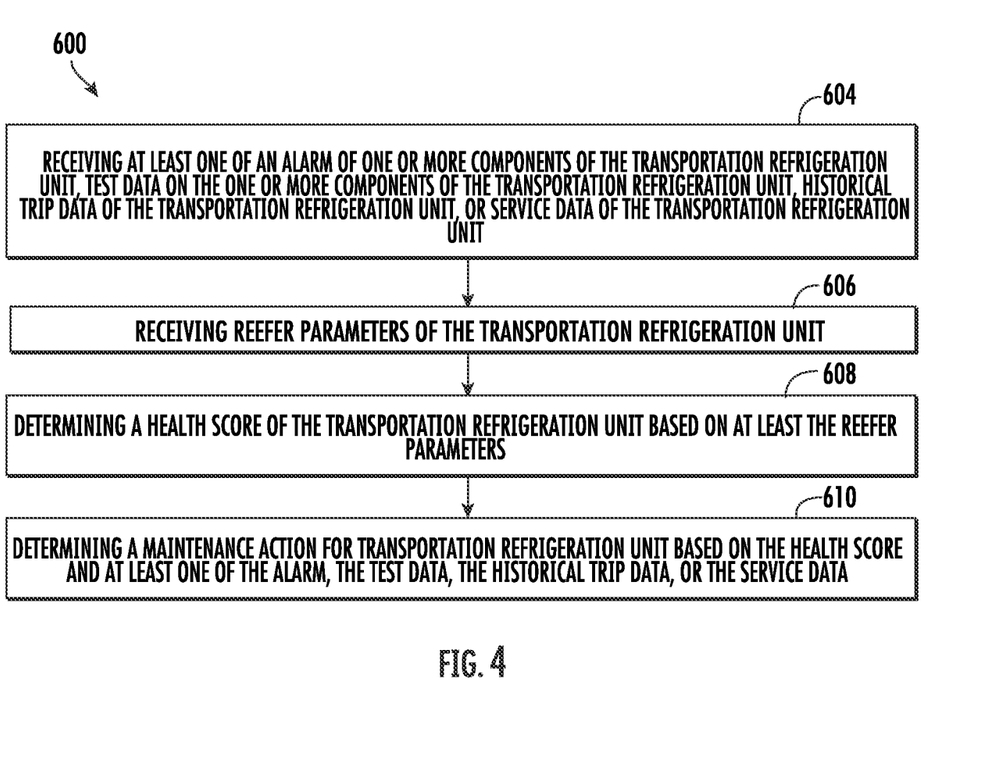
FIG. 4 is a flow chart illustrating a method of monitoring a health of a transportation refrigeration unit, according to an embodiment of the present disclosure.

At block 604, the transportation refrigeration unit 22 receives at least one of alarms 311 of one or more components of transportation refrigeration unit 22, test data 312 on one or more components of the transportation refrigeration unit 22, historical trip data 314 of the transportation refrigeration unit 22 is received, or service data 316 of the transportation refrigeration unit 22 is received. At block 606, the transportation refrigeration unit 22 receives reefer parameters 318 of the transportation refrigeration unit 22. At block 6108, a health score 382 of the transportation refrigeration unit 22 is determined based on at least the reefer parameters 318.

In an embodiment, the health score 382 may be determined by assigning a weight to each of the reefer parameters 318, then generating a weighted health prediction from each of the one or more components of the transportation refrigeration unit 22, and combining the output weighted health predictions into the health score 382 of the transportation refrigeration unit 22.

The method 600 may also include that the health score 382 is displayed on a computing device 500.

The method 600 may further include that user feedback 392 is received. The heath score 282 is adjusted based on the user feedback 392. The weight assigned to each of the reefer parameters 318 may also be adjusted based on the user feedback 392.

The method 600 may yet further that include warranty data 394 is received. The heath score 282 is adjusted based on the warranty data 394. The weight assigned to each of the reefer parameters 318 may also be adjusted based on the warranty data 394.

The method 600 may also include that the transportation refrigeration unit 22 is removed from service based on the maintenance action.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a health of a transportation refrigeration unit, the method comprising:
receiving at least one of an alarm of one or more components of the transportation refrigeration unit, test data on the one or more components of the transportation refrigeration unit, historical trip data of the transportation refrigeration unit, or service data of the transportation refrigeration unit;
receiving transportation refrigeration unit parameters of the transportation refrigeration unit during a current or latest trip of the transportation refrigeration unit;
determining a health score of the transportation refrigeration unit based on at least the transportation refrigeration unit parameters, wherein the health score comprises a number indicating a health of the transportation refrigeration based on one or more thresholds; and
determining a maintenance action for transportation refrigeration unit based on the health score and at least one of the alarm, the test data, the historical trip data, or the service data;
wherein determining the health score of the transportation refrigeration unit based on at least the transportation refrigeration unit parameters further comprises:
assigning a weight to each of the transportation refrigeration unit parameters;
generating a weighted health prediction from each of the one or more components of the transportation refrigeration unit; and
combining the weighted health predictions into the health score of the transportation refrigeration unit.

2. The method of claim 1, further comprising:
displaying the health score on a computing device.

3. The method of claim 1, further comprising:
receiving user feedback; and
adjusting the heath score based on the user feedback.

4. The method of claim 1, further comprising:
receiving warranty data; and
adjusting the heath score based on the warranty data.

5. The method of claim 1, further comprising:
receiving user feedback; and
adjusting the weight assigned to each of the transportation refrigeration unit parameters based on the user feedback.

6. The method of claim 1, further comprising:
receiving warranty data; and
adjusting the weight assigned to each of the transportation refrigeration unit parameters based on the warranty data.

7. The method of claim 1, wherein the health score indicates odds that the transportation refrigeration may fail and how soon.

8. A health analytics device for monitoring a health of a transportation refrigeration unit, the health analytics device comprising:
a processor; and
a memory comprising computer-executable instructions that, when executed by the processor, cause the processor to perform operations, the operations comprising:
receiving at least one of an alarm of one or more components of the transportation refrigeration unit, test data on the one or more components of the transportation refrigeration unit, historical trip data of the transportation refrigeration unit, or service data of the transportation refrigeration unit;
receiving transportation refrigeration unit parameters of the transportation refrigeration unit during a current or latest trip of the transportation refrigeration unit;
determining a health score of the transportation refrigeration unit based on at least the transportation refrigeration unit parameters, wherein the health score comprises a number indicating a health of the transportation refrigeration unit based on one or more thresholds; and determining a maintenance action for transportation refrigeration unit based on the health score and at least one of the alarm, the test data, the historical trip data, or the service data;
wherein determining the health score of the transportation refrigeration unit based on at least the transportation refrigeration unit parameters further comprises:
assigning a weight to each of the transportation refrigeration unit parameters;
generating a weighted health prediction from each of the one or more components of the transportation refrigeration unit; and
combining the weighted health predictions into the health score of the transportation refrigeration unit.

9. The health analytics device of claim 8, wherein the operations further comprise:
displaying the health score on a computing device.

10. The health analytics device of claim 8, wherein the operations further comprise:
receiving user feedback; and
adjusting the heath score based on the user feedback.

11. The health analytics device of claim 8, wherein the operations further comprise:
receiving warranty data; and
adjusting the heath score based on the warranty data.

12. The health analytics device of claim 8, wherein the operations further comprise:
receiving user feedback; and
adjusting the weight assigned to each the transportation refrigeration unit parameters based on the user feedback.

13. The health analytics device of claim 8, wherein the operations further comprise:
receiving warranty data; and
adjusting the weight assigned to each of the transportation refrigeration unit parameters based on the warranty data.

14. The health analytics device of claim 8, wherein the health score indicates odds that the transportation refrigeration unit may fail and how soon.

15. A computer program product tangibly embodied on a non-transitory computer readable medium, the computer program product including instructions that, when executed by a processor, cause the processor to perform operations comprising:
receiving an alarm of one or more components of the transportation refrigeration unit, test data on the one or more components of the transportation refrigeration unit, historical trip data of the transportation refrigeration unit, or service data of the transportation refrigeration unit;
receiving transportation refrigeration unit parameters of the transportation refrigeration unit during a current or latest trip of the transportation refrigeration unit;
determining a health score of the transportation refrigeration unit based on at least the transportation refrigeration unit parameters, wherein the health score comprises a number indicating a health of the transportation refrigeration based on one or more thresholds; and
determining a maintenance action for transportation refrigeration unit based on the health score and at least one of the alarm, the test data, the historical trip data, or the service data;
wherein determining the health score of the transportation refrigeration unit based on at least the transportation refrigeration unit parameters further comprises:
assigning a weight to each of the transportation refrigeration unit parameters;
generating a weighted health prediction from each of the one or more components of the transportation refrigeration unit; and
combining the weighted health predictions into the health score of the transportation refrigeration unit.

16. The computer program product of claim 15, wherein the operations further comprise:
displaying the health score on a computing device.

17. The computer program product of claim 15, wherein the operations further comprise:
receiving user feedback; and
adjusting the heath score based on the user feedback.

* * * * *